(12) United States Patent
Katada (10) Patent No.: US 10,376,919 B2
(45) Date of Patent: Aug. 13, 2019

(54) LINEAR VIBRATION MOTOR

(71) Applicant: Nidec Copal Corporation, Tokyo (JP)

(72) Inventor: Yoshinori Katada, Tokyo (JP)

(73) Assignee: Nidec Copal Corporation, Tokyo (JP)

( * ) Notice: Subject to any disclaimer, the term of this patent is extended or adjusted under 35 U.S.C. 154(b) by 306 days.

(21) Appl. No.: 15/329,152

(22) PCT Filed: Jul. 27, 2015

(86) PCT No.: PCT/JP2015/071256
§ 371 (c)(1),
(2) Date: Jan. 25, 2017

(87) PCT Pub. No.: WO2016/017586
PCT Pub. Date: Feb. 4, 2016

(65) Prior Publication Data
US 2017/0216884 A1    Aug. 3, 2017

(30) Foreign Application Priority Data
Jul. 30, 2014  (JP) ................. 2014-155545

(51) Int. Cl.
*H02K 33/16* (2006.01)
*B06B 1/04* (2006.01)
*H02K 33/02* (2006.01)

(52) U.S. Cl.
CPC ............ *B06B 1/045* (2013.01); *H02K 33/02* (2013.01); *H02K 33/16* (2013.01)

(58) Field of Classification Search
CPC ........ H02K 7/083; H02K 33/00; H02K 33/02; H02K 33/06; H02K 33/16; B06B 1/045
See application file for complete search history.

(56) References Cited

U.S. PATENT DOCUMENTS 4,928,028 A * 5/1990 Leibovich ............. H01F 7/1646
                                                          310/23
7,683,749 B2 * 3/2010 Yajima ............... H02K 41/0356
                                                          335/222

(Continued)

FOREIGN PATENT DOCUMENTS

CN       1783673 A    6/2006
CN     102971947 A    3/2013

(Continued)

OTHER PUBLICATIONS

International Search Report (English and Japanese) and PCT Written Opinion (Japanese) dated Oct. 13, 2015 issued in corresponding PCT International Application No. PCT/JP2015/071256.

*Primary Examiner* — Dang D Le
(74) *Attorney, Agent, or Firm* — Troutman Sanders LLP (57) ABSTRACT

The present invention guides the linear vibrations of a needle, obtains stable vibrations and exhibits excellent impact strength, and makes thinness or widthwise compactness possible. A linear vibration motor equipped with: a needle equipped with a magnet and a spindle part; a frame for slidably supporting the needle in one axial direction; a coil for driving the magnet in the one axial direction, and affixed to the frame; and an elastic member for imparting an elastic force to the needle in opposition to the driving force imparted on the magnet. Furthermore, a guide groove extending in the one axial direction is provided in the needle or the frame, and a rolling body for rolling and being guided by the guide groove is provided in the other of the needle and the frame.

2 Claims, 5 Drawing Sheets

(56) References Cited

U.S. PATENT DOCUMENTS

| | | | |
|---|---|---|---|
| 8,188,623 B2 * | 5/2012 | Park | ................ H02K 33/16 310/12.01 |
| 2006/0114090 A1 | 6/2006 | Yajima et al. | |
| 2010/0134225 A1 | 6/2010 | Yajima et al. | |
| 2013/0169071 A1 | 7/2013 | Endo et al. | |

FOREIGN PATENT DOCUMENTS

| | | |
|---|---|---|
| DE | 102005057560 A1 | 6/2006 |
| JP | 2006-187192 A | 7/2006 |
| JP | 2011097747 A | 5/2011 |
| JP | 2011205870 A | 10/2011 |
| JP | 2012016153 A | 1/2012 |
| KR | 2006-0061252 A | 6/2006 |
| KR | 2013-0111515 A | 10/2013 |
| TW | 201223083 A | 6/2012 |
| WO | 2012/002329 A1 | 1/2012 |

* cited by examiner

LINEAR VIBRATION MOTOR

CROSS-REFERENCE TO RELATED APPLICATIONS

This is a U.S. national phase application under 35 U.S.C. § 371 of International Patent Application No. PCT/JP2015/071256, filed Jul. 27, 2015, and claims benefit of priority to Japanese Patent Application No. 2014-155545, filed Jul. 30, 2014. The entire contents of these applications are hereby incorporated by reference.

FIELD OF TECHNOLOGY

The present invention relates to a linear vibration motor that causes a movable element to undergo linearly reciprocating vibration through a signal input.

BACKGROUND

A vibration motor (or a vibration actuator) is that which communicates, to a user of a communication device or to an operator who is holding any of a variety of electronic devices, the state of an input signal through a vibration, through generating a vibration through an incoming call on a communication device or through the transmission of an alarm on any of a variety of electronic devices, and is built into any of a variety of electronic devices, such as mobile information terminals, including mobile telephones.

Among the various forms of vibration motors that are under development, there are known linear vibration motors that are able to generate relatively large vibrations through linear reciprocating vibrations of a movable element. The linear vibration motor is provided with means for guiding linear reciprocating vibration of the movable element, making it possible to produce a stabilized vibration wherein there is little noise produced through components striking each other, and because the movable element is held by the guiding means, this can produce resistance to damage when there is a drop impact.

Linear vibration motors equipped with stationary shafts are known as such linear vibration motors that are equipped with means for guiding the movable element. In this prior art there are proposals for structuring a driving portion through a coil that is secured to a case and a magnet that is disposed within the coil, and structuring a movable element by connecting, along the direction of vibration, a weight portion to the magnet, where a through hole is formed along the direction of vibration of the movable element and one stationary shaft passes through this through hole (See, for example, Japanese Unexamined Patent Application Publication No. 2012-16153), and for the provision of two stationary shafts along the direction of vibration, wherein a driving portion made from a coil and a magnet is disposed between the two stationary shafts, and a weight portion is provided, where a movable element that is driven by the driving portion is supported by the two stationary shafts so as to be able to slide (See, for example, Japanese Unexamined Patent Application Publication No. 2011-97747), and the like.

SUMMARY

With smaller and thinner mobile electronic devices there is the need for smaller and thinner vibration motors to be equipped therein. In particular, in electronic devices such as smart phones that are equipped with flat panel displaying portions, space within the devices is limited in the direction of thickness, perpendicular to the plane of the display, so there is a strong need for thinner vibration motors to be equipped therein.

When one considers reducing the thickness of the linear vibration motor wherein a movable element is guided by a stationary shaft, or the like, if a through hole is formed, in the direction of vibration, in a movable element wherein a weight portion is connected, in the direction of vibration, to the magnet, as in the first of the prior art described above, and a stationary shaft is passed through this through hole, then it would be necessary to form the through hole in the magnet itself, requiring the thickness of the magnet to be adequately thick, relative to the diameter of the stationary shaft, in order to secure an adequate volume for the magnet for producing the desired driving force. Moreover, the driving portion is structured through the provision also of a coil around the magnet, and thus there is a problem in that this is not completely compatible with reducing thickness. Moreover, while one may consider forming the through hole in the magnet itself through dividing into magnets on the left and the right of the stationary shaft, this would increase the number of components for the magnet, not only preventing good manufacturability, but also producing a problem in that it would be difficult to secure the magnet volume for producing an adequate driving force.

In contrast, if two stationary shafts are provided and a driving portion is provided therebetween, as in the latter of the prior art technologies described above, it would not be necessary to form a through hole through the magnet, thus enabling the magnet to be made thinner. However, because two stationary shafts are provided, on both sides of the magnet, a problem is produced in that the width of the linear vibration motor is wide. In recent years there have been requests for linear vibration motors that are to be installed in miniaturized electronic devices to be more compact, not only in the thickness direction, but in the width direction as well.

Moreover, because in both of the prior art technologies set forth above coil springs are provided around the stationary shafts, of necessity the diameters of the coil springs must be larger than the diameters of the stationary shafts. Because the diameters of the stationary shafts must, to some degree, be large to facilitate processing of components and in order to produce a stabilized vibration, there is a problem in that the provision of coil springs with diameters even larger than those would cause a reduction in thickness difficult.

In the present invention, the handling of such problems is an example of the problem to be solved. That is, objects of the present invention are to enable a reduction in thickness and a reduction in size in the width direction, while guiding the linear vibration of the movable element in order to achieve stabilized vibration and with superior ability to withstand shock, to reduce the thickness and reduce the size in the width direction while not increasing the number of magnetic components and while preventing a reduction in the volume of the magnet, and the like.

Means for Solving the Problem

In order to achieve such an object, the linear vibration motor of the present invention is equipped with the following structures:

A linear vibration motor comprising: a movable element equipped with a magnet and a weight portion; a frame for supporting the movable element so as to be able to slide along the axial direction; a coil, secured to the frame, for driving the magnet along the axial direction; and an elastic member for applying, to the movable element, an elastic force that opposes the driving force that is applied to the magnet, wherein: a guide groove that extends in the axial direction is provided in one of either the movable element or the frame; and a rolling element that rolls guided by the guide groove is provided in the other one of the frame or the movable element.

DETAILED DESCRIPTION

An example according to the present invention will be explained below in reference to the drawings (where in different drawings below, identical reference symbols indicate identical positions, and redundant explanations in the individual drawings are omitted.) FIG. 1 through FIG. 4 illustrate the overall structure of a linear vibration motor according to one example according to the present invention. The X direction in each of the drawings indicates the direction of vibration (the axial direction), the Y direction indicates the width direction, and the Z direction indicates the thickness (height) direction.

A linear vibration motor 1 comprises: a movable element 10 that is provided with a magnet 3 and a weight portion 6; a frame 2 that supports the movable element 10 so as to be able to slide in the axial direction; a coil 5 that is secured to the frame 2, for driving the magnet 3 along the axial direction; and an elastic member 7 for applying, to the movable element 10, an elastic force that opposes the driving force applied by the magnet 3.

Figure 1:
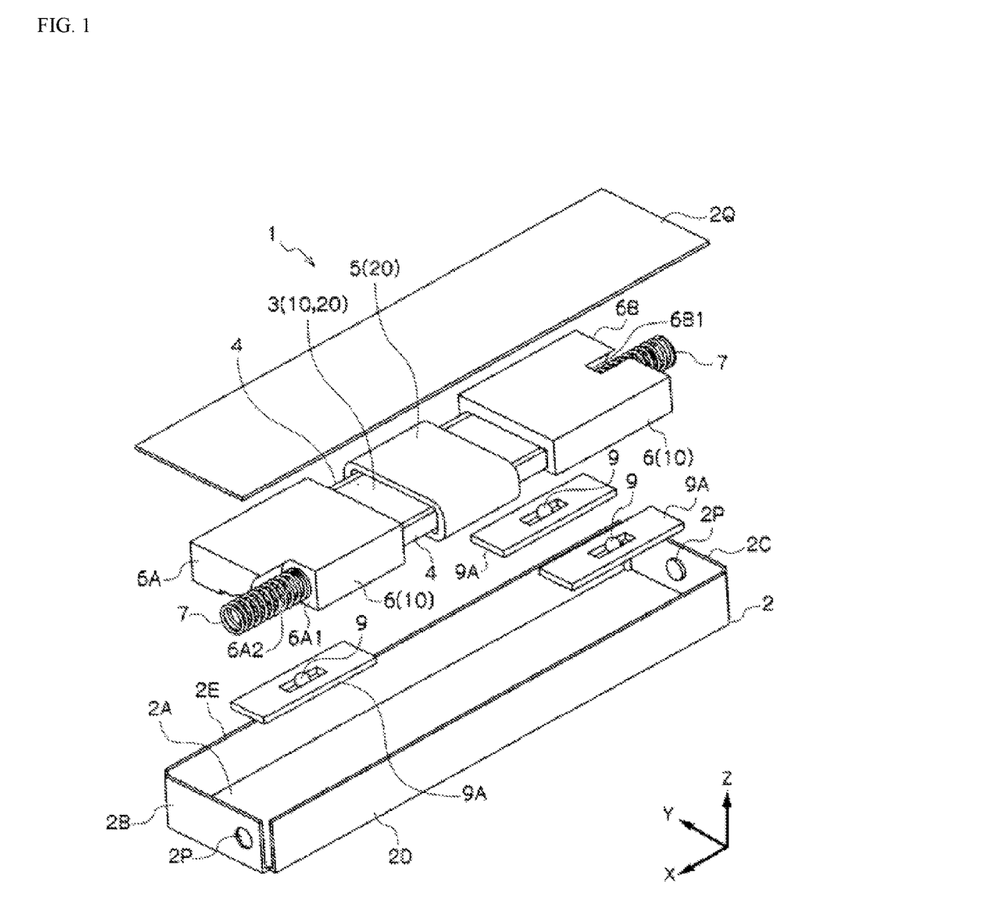
FIG. 1 is an assembly perspective diagram wherein the overall structure of a linear vibration motor according to an example according to the present invention is viewed from the top face.
Figure 2:
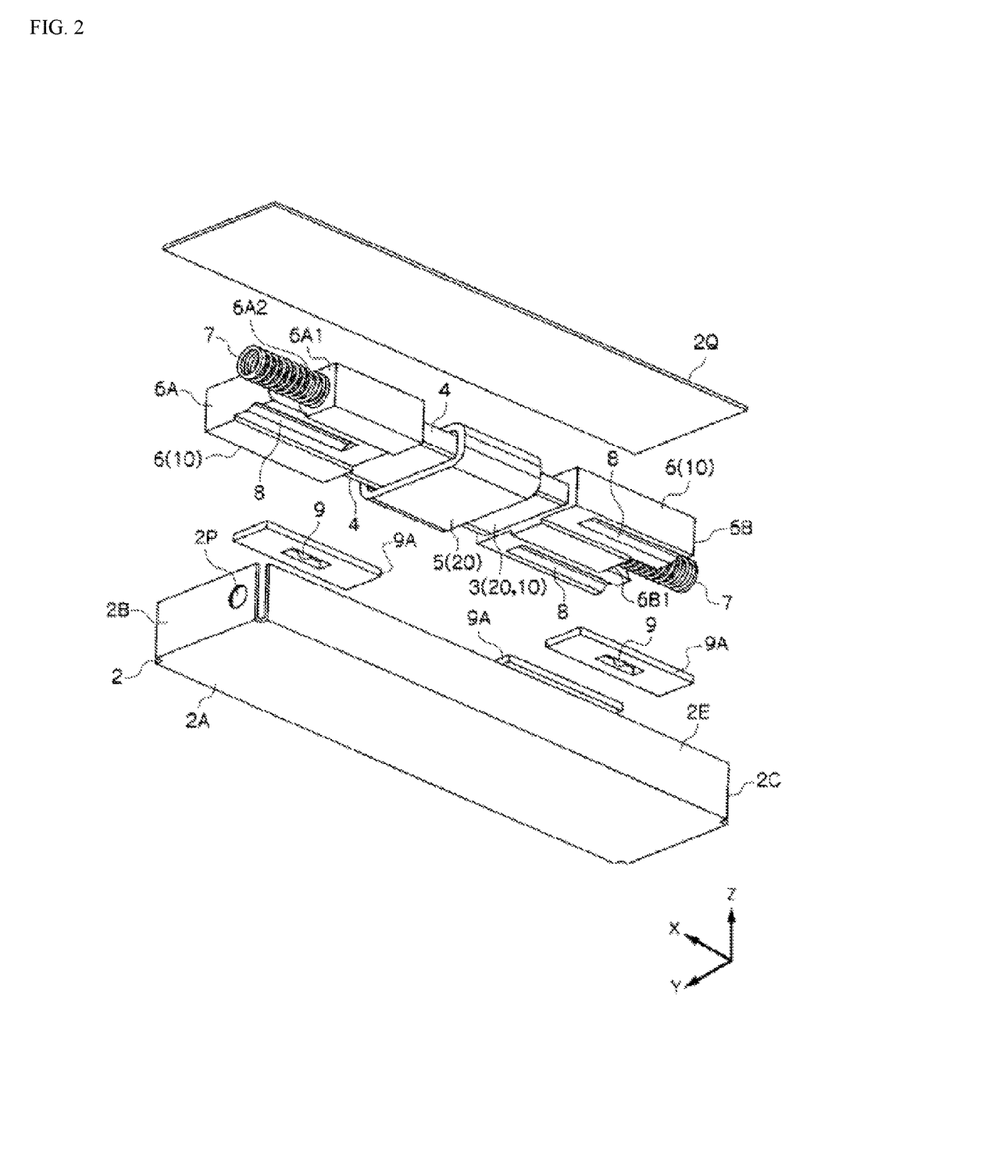
FIG. 2 is an assembly perspective diagram wherein the overall structure of a linear vibration motor according to an example according to the present invention is viewed from the back face.

The frame 2 may have a frame structure that is able to contain the various portions; however, in the example that is illustrated, side walls 2B, 2C, 2D, and 2E are provided extending from the periphery of a rectangular bottom face 2A. Moreover, the frame 2, as necessary, is provided with a cover plate 2Q for covering that which is contained within the frame 2. The cover plate 2Q is formed in a rectangular plate shape that is attached to the top end faces of the side walls 2B through 2E. This frame 2 can be formed through machining a metal plate (for example, through performing a pressing process, or the like).

A driving portion 20 is structured from a coil 5 that is secured to the frame 2, and a magnet 3 that is a portion of the movable element 10. Lorentz forces that act on the magnet 3 through the application of the electric current to the stationary coil 5 act as driving forces that cause the movable element 10 to vibrate along the axial direction (the X direction in the figure).

Figure 3:
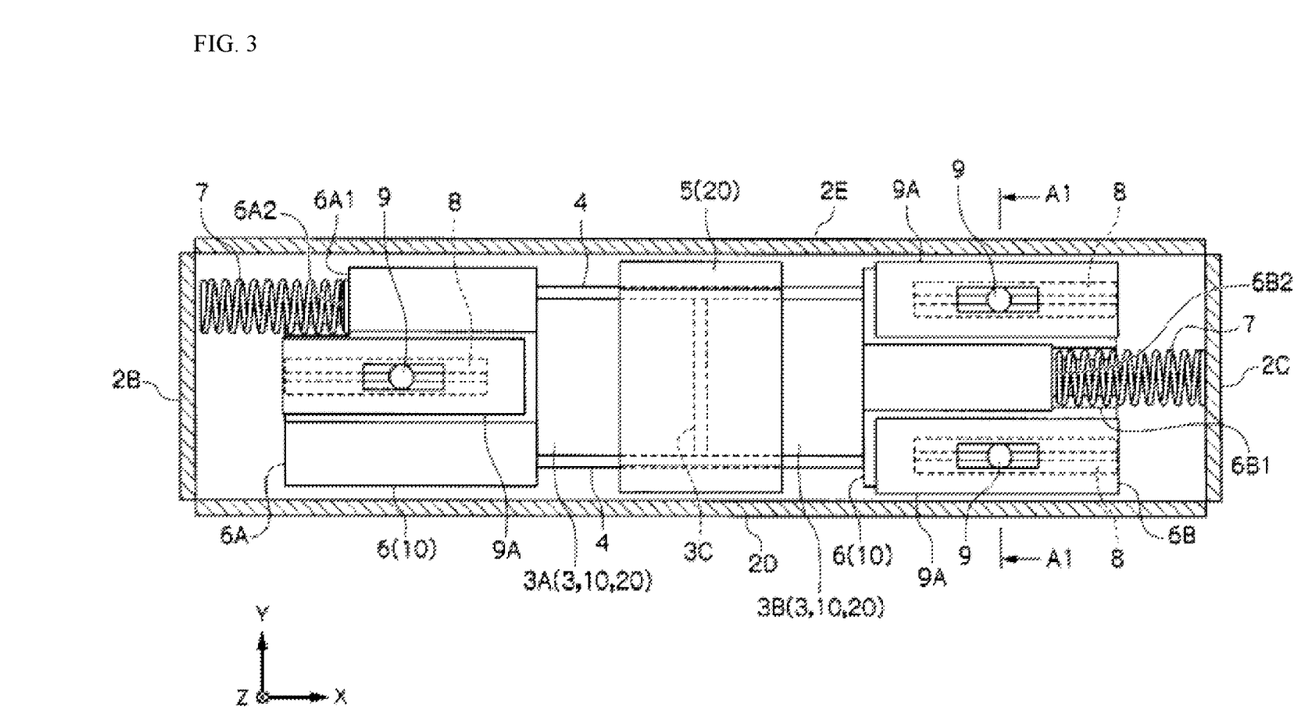
FIG. 3 is an explanatory diagram (a cross-sectional diagram along section A2-A2 in FIG. 4) illustrating the overall structure of a linear vibration motor according to an example according to the present invention.
Figure 4:
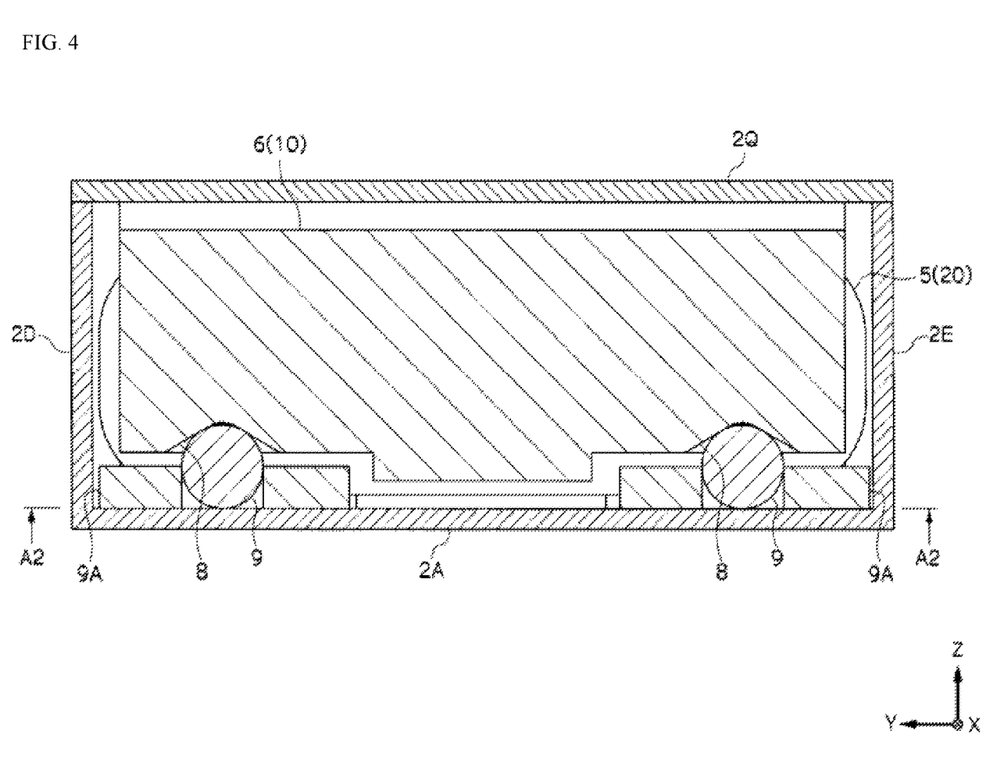
FIG. 4 is an explanatory diagram (a cross-sectional diagram along section A1-A1 in FIG. 3) illustrating the overall structure of a linear vibration motor according to an example according to the present invention.

As illustrated in FIG. 3, in the magnet 3, two flat rectangular magnet pieces 3A and 3B that have polarities along the axial direction (the X direction in the figure) are disposed with identical poles facing each other, connected with a spacer yoke 3C interposed therebetween. If necessary, a reinforcing plate 4 is secured to a side face of the magnet 3 to increase the rigidity of the magnet 3 thereby.

In the coil 5, an electric wire is wound along the Y and Z directions around the magnet 3 wherein the direction of the magnetic pole faces the X direction, with the top face and/or bottom face of the coil 5 and, if necessary, a side face thereof as well, secured to the inner surface of the frame 2. Securing of the coil 5 to the frame 2 may be through securing directly to the frame 2, or the coil 5 may be wound onto a coil bobbin with the coil bobbin secured to the frame 2.

In the example that is illustrated, in the movable element 10, weight portions 6 are connected to both end portions of the magnet 3 in the axial direction (the X direction in the figure). The weight portions 6 may be structured through, for example, a metal material with a high specific gravity, and in the example that is illustrated, are shaped essentially as rectangular solids wherein the height in the Z direction is greater than the thickness of the magnet 3, and the width in the Y direction is greater than the width of the magnet 3.

A guide groove 8 is provided along the axial direction in one of either the movable element 10 or the frame 2, and a rolling element 9, which rolls guided by the guide groove 8, is provided in the other one of either the frame 2 or the movable element 10. In the example that is illustrated, the guide groove 8 is provided in the back face of the weight portion 6 of the movable element 10, and the rolling element 9 is provided in the bottom face 2A of the frame 2; however the guide groove 8 may be provided instead on the frame 2 side, with the rolling element 9 provided on the movable element 10 (the weight portion 6) side. In the example that is illustrated, the rolling element 9 is attached, so as to enable rolling, to the bottom face 2A of the frame 2 by a rolling element holder 9A.

In the example that is illustrated, guide grooves 8 are provided in two locations along the direction that is perpendicular to the axial direction, and one location that is separate, in the axial direction, from these two locations. Providing guide grooves 8 and rolling elements 9 in three locations in this way enables the positions of the portions that make contact between the guide grooves 8 and the rolling element 9 to be within a single plane, enabling the movable element 10 to be guided along the axial direction in a stable state.

An elastic member 7 applies, to the movable element 10, an elastic force that opposes the driving force of the driving portion 20. In the example that is illustrated, coil springs that extend and compress along the axial direction (the X direction) are used as the elastic members 7, where on one side one elastic member 7 is disposed between the weight portion 6 and the side wall 2B (2C). In the example that is illustrated, one end of the elastic member 7 engages with a supporting protrusion 2P that is provided on the side wall 2B or 2C, and the other end of the elastic member 7 engages with a supporting protrusion 6A2 or 6B2 that is in a recessed portion 6A1 or 6B1 that is provided in an end portion 6A or 6B of the weight portion 6.

The operation of such a linear vibration motor 1 will be explained. When not driven, the movable element 10 stands still in the vibration center position wherein the elastic forces of the elastic members 7 are in equilibrium. When an electric current of a vibration generation signal is inputted into the coil 5, a driving force is applied to the magnet 3 in the X direction, and the movable element 10 undergoes reciprocating vibration along the axial direction through the driving force and the elastic repulsive force of the elastic member 7.

Such a linear vibration motor 1 makes it possible to produce a stabilized vibration wherein there is little noise generated by components contacting each other, or the like, because the reciprocating vibration of the movable element 10 is guided by the guide grooves 8 that are formed along the axial direction and the rolling elements 9 that roll guided thereby, and the movable element 10 is held by the guide grooves 8 guiding the rolling elements 9, making it possible to produce resistance to damage when there is a drop impact.

Moreover, because no hole passes through the magnet 3, it is possible to secure a volume for the magnet that can produce an adequate driving force, through a magnet 3 that is wide in the Y direction and thin in the Z direction. This enables the production of a thin linear vibration motor 1 able to produce a sufficient driving force. In contrast, with a type wherein a stationary shaft passes through the magnet, as in the prior art, there would be the need for the thickness of the magnet to be substantially larger than the stationary shaft, in order to produce an adequate driving force, and because the coil is also wound around the magnet, it would be difficult to produce an adequate reduction in thickness.

Moreover, the provision of the guide grooves 8 and the rolling elements 9 within the width of the movable element 10 enables the linear vibration motor 1 according to the example according to the present invention to have the left-right width thereof reduced in size because there is no need for a space to dispose shafts on the left and right of the magnet 3, in contrast to the prior art wherein stationary shafts are provided on both the left and right sides of the magnet.

Moreover, the linear vibration motor 1 according to the example according to the present invention can secure the magnet volume for producing an adequate driving force, without dividing the magnet 3. This enables the production of a linear vibration motor 1 wherein the movable element 10 is guided so as to be able to slide along the axial direction, through a structure wherein there is no increase in the number of components of the magnet 3, and wherein reduction in volume of the magnet 3 is prevented.

Moreover, the diameter of the elastic member 7 can be reduced independently from the other structural members. When the diameter of the elastic member 7 is reduced, the elastic force may be set arbitrarily through the selection of the material for the elastic members 7 and through providing many elastic members 7 in parallel. This also enables a reduction in thickness of the linear vibration motor 1 wherein the movable element 10 is guided so as to be able to slide along the axial direction.

In such a linear vibration motor 1, preferably the position of the magnet 3 that is connected to the weight portion 6 of the movable element 10 is shifted from the center to the side wherein the guide grooves 8 and the rolling elements 9 are provided. Shifting the position of the magnet 3 in this way causes the position of the movable element 10 to be secured through the rolling elements 9 being pressed into the guide grooves 8 through the magnetic attraction that acts between the magnet 3 and the bottom face 2A of the frame 2, which is made of metal, thus enabling greater stabilization of the linear vibration of the movable element 10.

As explained above, in the linear vibration motor 1 according to the example according to the present invention, the movable element 10 is guided by the guide grooves 8 and the rolling elements 9 to undergo vibration linearly, not only enabling stabilized vibration in the same manner as if a stationary shaft were provided, but also enabling resistance to damage in the event of a drop impact. Additionally, such a linear vibration motor 1 can be made thinner and more compact in the width direction, while having no increase in the number of components of the magnet 3 and while suppressing a reduction in the volume of the magnet 3.

Figure 5:
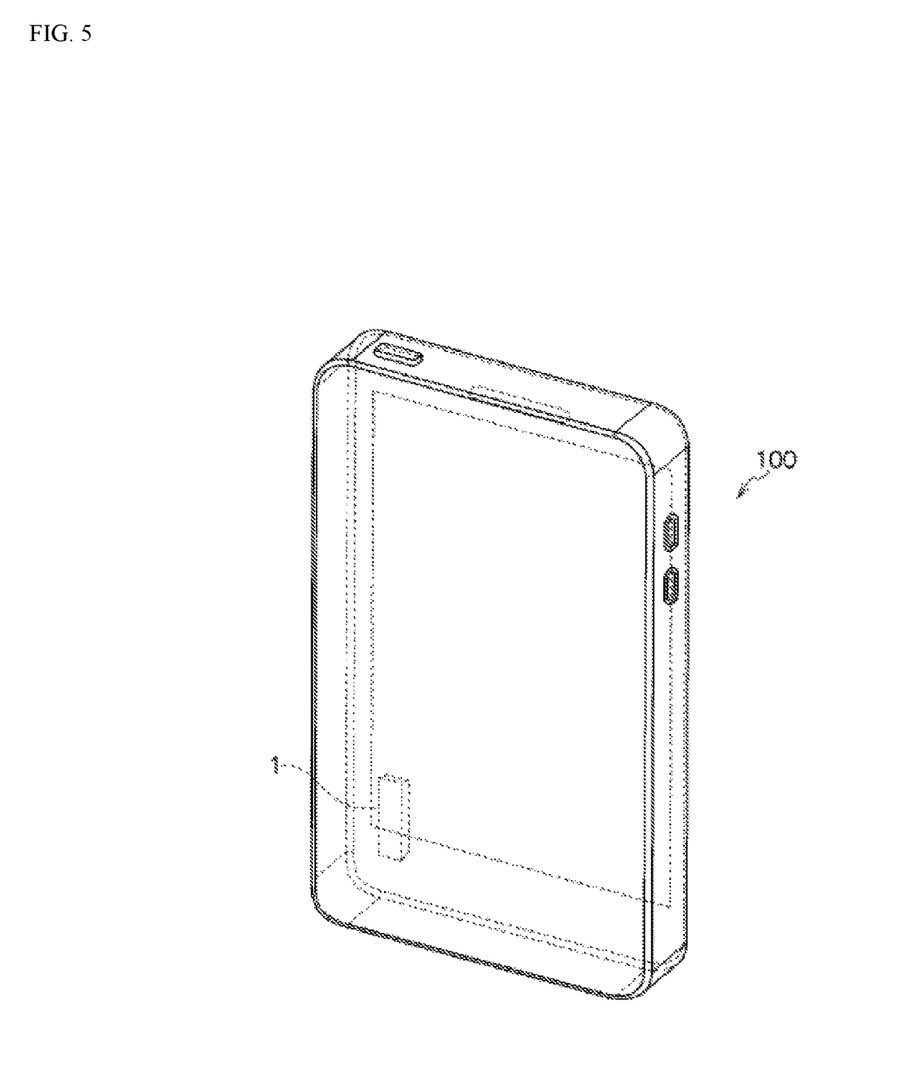
FIG. 5 is an explanatory diagram illustrating the electronic device (a mobile information terminal) equipped with a linear vibration motor according to an example according to the present invention.

FIG. 5 shows a mobile information terminal 100 as an example of an electronic device equipped with a linear vibration motor 1 according to an example according to the present invention. The mobile information terminal 100 that is equipped with the linear vibration motor 1 that can produce a stabilized vibration and for which the thickness can be reduced and which can be made more compact in the width direction enables the user to be notified through a stabilized vibration that does not tend to produce noise, when there is an incoming call in a communication function or at the beginning or end of an operation such as an alarm function. Moreover, this makes it possible to produce a mobile information terminal 100 with high mobility and which facilitates design performance, through the linear vibration motor 1 having reduced thickness and being more compact in the width direction. Furthermore, because the linear vibration motor 1 is of a compact shape wherein the various components are contained within a frame 2 of a rectangular shape wherein the thickness is suppressed, it can be mounted, with excellent space efficiency, within a thinner mobile information terminal 100.

While examples according to the present invention were described in detail above, referencing the drawings, the specific structures thereof are not limited to these examples, but rather design variations within a range that does not deviate from the spirit and intent of the present invention are also included in the present invention.

The invention claimed is:

1. A linear vibration motor comprising:
   a movable element comprising a magnet and a weight portion;
   a frame supporting the movable element so as to be able to slide along the axial direction;
   a coil, secured to the frame, driving the magnet along the axial direction;
   an elastic member applying, to the movable element, an elastic force that opposes the driving force that is applied to the magnet;
   a guide groove that extends in the axial direction is provided in one of either the movable element or the frame; and
   a rolling element that rolls guided by the guide groove is provided in the other one of the frame or the movable element, wherein:
   the guide groove is provided in two locations that are lined up in a direction that is perpendicular to the axial direction, and one location that is separate, in the axial direction, from the two locations.

2. A linear vibration motor comprising:
   a movable element comprising a magnet and a weight portion;
   a frame supporting the movable element so as to be able to slide along the axial direction;
   a coil, secured to the frame, driving the magnet along the axial direction;

an elastic member applying, to the movable element, an elastic force that opposes the driving force that is applied to the magnet;
a guide groove that extends in the axial direction is provided in one of either the movable element or the frame; and
a rolling element that rolls guided by the guide groove is provided in the other one of the frame or the movable element, wherein:
the weight portion is connected to both axial-direction end portions of the magnet; and
guide grooves are provided in each of the weight portions.

* * * * *